United States Patent [19]

Arkenbout

[11] 4,257,796
[45] Mar. 24, 1981

[54] CRYSTALLIZATION COLUMN

[75] Inventor: Gerardus J. Arkenbout, Zeist, Netherlands

[73] Assignee: Nederlandse Centrale Organisatie Voor Toegepast-Natuurwetenschappelijk Onderzoek, The Hague, Netherlands

[21] Appl. No.: 768,145

[22] Filed: Feb. 14, 1977

Related U.S. Application Data

[63] Continuation-in-part of Ser. No. 606,341, Aug. 21, 1975, abandoned, which is a continuation-in-part of Ser. No. 194,945, Nov. 2, 1971, abandoned.

[30] Foreign Application Priority Data

Nov. 13, 1970 [NL] Netherlands .......................... 7016632

[51] Int. Cl.³ .............................................. B01D 9/02
[52] U.S. Cl. ...................................... 62/538; 422/275
[58] Field of Search ............. 23/267 C, 273 R, 273 F, 23/270 R, 293 R, 296; 62/538; 422/261, 275; 423/658.5

[56] References Cited

U.S. PATENT DOCUMENTS

| | | | |
|---|---|---|---|
| 2,011,186 | 8/1935 | Van Dijck | 23/267 C |
| 2,635,949 | 4/1953 | Fenske | 23/267 C |
| 2,742,381 | 4/1956 | Weiss | 23/267 C |
| 3,116,980 | 1/1964 | Grimmett | 23/270 |
| 3,119,721 | 1/1964 | Suares | 23/267 C |
| 3,392,539 | 7/1968 | Grimmett | 23/267 C |
| 3,582,286 | 6/1971 | Tanaka | 23/273 |
| 3,723,071 | 3/1973 | Brown | 23/267 C |

*Primary Examiner*—Hiram Bernstein
*Attorney, Agent, or Firm*—Hammond & Littell, Weissenberger and Muserlian

[57] ABSTRACT

A process for the operation of a counter current crystallization column is described in which perforated plates or screens are positioned at spaced intervals. Movable objects such as steel balls or plastic balls are inserted in the column on each of the plates or screens and set into vibration by some kind of distance effect such as vibration of the entire column. The vibrating objects promote the passage of the crystals through the plate in that they have a milling effect on the crystals and are drumming against the plates. When said effect is wanted at the under side of the plates, supporting screens are mounted just below the plates and provided with the movable objects.

7 Claims, 2 Drawing Figures

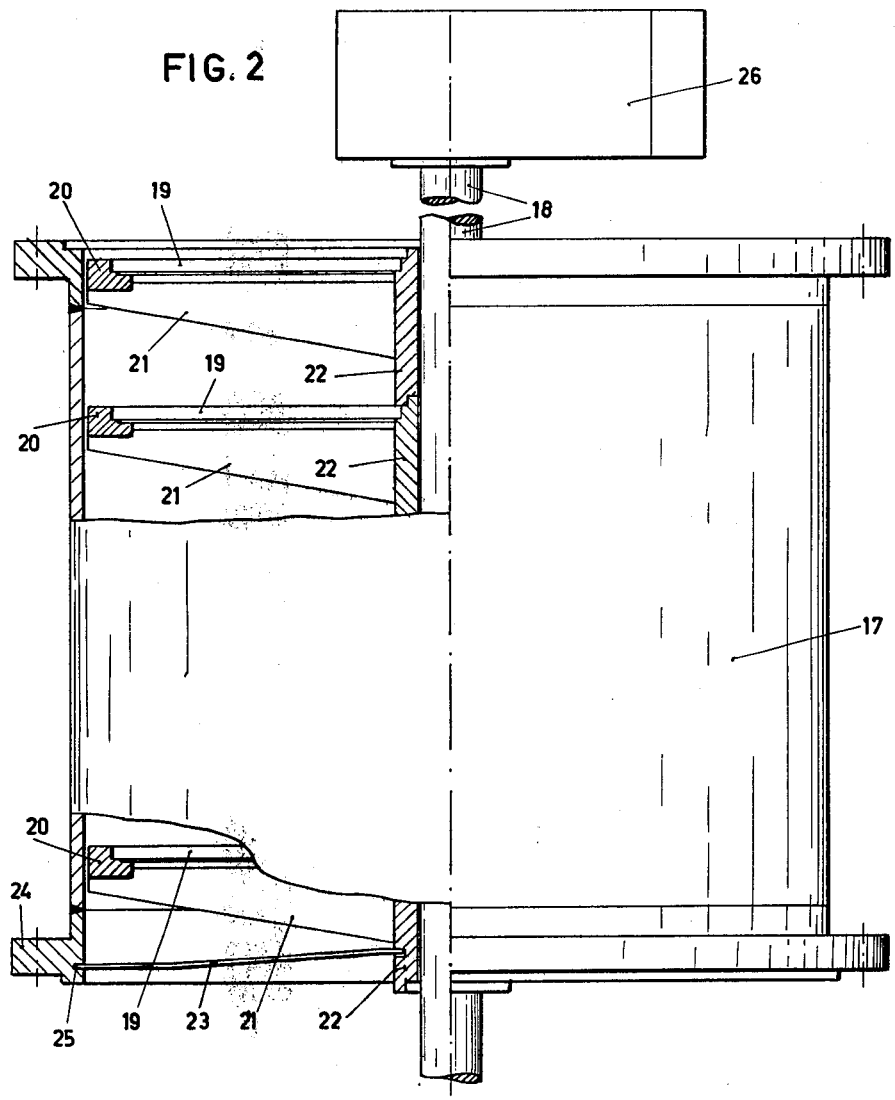

CRYSTALLIZATION COLUMN

CROSS-REFERENCES

This is a continuation-in-part of the previous patent application Ser. No. 606,341, filed Aug. 21, 1975, now abandoned, which in turn was a continuation-in-part of Ser. No. 194,945, filed Nov. 2, 1971, now abandoned.

BACKGROUND OF THE INVENTION

1. Field of the Invention

Multi-stage separation by crystallisation can be carried out continuously in a crystallisation column through which crystals are passed in counter-current with a liquid which is either a melt or a solution, with which they are in continuous exchange.

The process proceeds similarly to rectifying distillation. Crystals are formed at one end section of the column in a crystallisation zone. These crystals are transported in counter-current with the melt of the solution respectively, in the centre part, the exchange zone, which is the crystallisation column proper. At the other end section, in the melt or solution zone respectively, the crystals are converted into melt or else redissolved to a saturated solution by the application of heat.

If crystallisation is effected out of a mother liquor, the end of the crystallisation zone will furthermore be connected to a reflux cooler in which the mother liquor is condensed and then transported to the solution zone of the column. If the column is arranged vertically, the crystals are transported by gravity. This means that the crystals are transported downwards if they are heavier than the surrounding liquid. If the crystals are lighter than the liquid, they are transported upwards. In the first case the crystallisation zone is at the top of the column and the melt zone at the bottom. In the second case (ice-water) the crystalliser is at the bottom and the melt zone at the top of the column.

In the exchange zone, which is preferably kept in an adiabatic condition, a concentration gradient may establish itself owing to the recrystallisation process and/or an extractive washing process.

As is the case with continuous distillation, it is possible to draw off at both ends of the column. The mixture to be separated can be fed into the column at a suitable place. The amount drawn off is determined, inter alia, by the phase diagram of the components involved in separation and the mass-balance in the column. It is, of course, important to make the separation as economically as possible.

The application of counter-current crystallisation is curbed by the lack of a crystallisation column in which crystals can be brought simply and reliably into counter-current and effective contact with liquid. It is not surprising, therefore, that a number of attempts have been made to develop a crystallisation column in which purification and/or concentration processes of organic and inorganic compounds can be effected efficiently and economically on an industrial scale by means of crystallisation.

2. Description of the Prior Art

A number of developments are reviewed in the book Fractional Solidification by M. Zief and W. R. Wilcox (published by Marcel Dekker Inc. New York in 1967).

Prior art examples of crystallisation columns are those in which the transportation of crystals is regulated by means of a piston or a rotating helix.

With the piston principle, it is unavoidable that moving the piston downwards causes "wads" of crystals to form which uncontrollably form channels for the liquid phase. Furthermore, the mechanical system itself results in undesirable channel forming. Owing to this, the separating effect per unit of length of such columns is slight. Moreover, such columns do not lend themselves for central feeding, but only for end feeding.

With another prior art type of column, transportation is effected by a helix rotating in an annular gap. In a number of cases, good results have been obtained with this column. The method proves, however, to depend very much on the mixture to be purified. Even with minor variations in process conditions, a small separating effect or column breakage or other mechanical breakdowns can occur.

The workmanship of the helix has to be of a very high standard. Partly because of this, industrial application of this transport mechanism involves many complications.

The invention relates to a crystallisation column for countercurrent crystallisation, having a plurality of perforated plates positioned at regularly spaced intervals.

Such a column is known in the art.

With this prior art apparatus a vertically reciprocating pulsation at a frequency of 5–500/minute and a stroke preferably of 200 mm (with a column length of 1 meter) is transmitted to the liquid by application of a piston mechanism installed in a side tube. A drawback of this simple column is that the process variables, such as crystal size, mixing, and density of packing, cannot be adequately controlled. Moreover, this column does not provide enough possibilities of preventing crystal masses adhering to the wall or of breaking up large crystal agglomerates.

Since, with this prior art apparatus, vigorous mixing will occur owing to the considerable vertically reciprocating movement of the liquid in the compartments between the perforated plates, the separating action of this known column per unit of length (the plate number) is only low.

SUMMARY OF THE INVENTION

1. Objects of the Invention

The object of the invention is to provide a crystallisation column having a relatively large separation efficiency per unit of column length.

Another object of the invention is to provide an effective crystallisation column in which agglomeration of the crystals and tunneling of the mass of crystals is suppressed and prevented.

Other objects of the invention will appear from the description below.

2. Brief Summary of the Invention

In the column according to the invention a limited number of freely movable objects are present resting loosely in the compartments on the perforated plates in contact with the crystal suspension to be separated whilst means are provided for putting the said objects into vibration so as to exert a drumming action on the perforated plate and on the crystals in their neighbourhood.

GENERAL REMARKS ON THE INVENTION

Some distance under each perforated plate there may be provided a perforated supporting element such as a perforated plate or a wire mesh screen; in that case the loosely resting movable objects are positioned both on the perforated plates and also on the supporting elements.

The objects to be put in vibrational motion between the perforated plates may have numerous shapes and dimensions and may be put in motion in various ways. Advantagely, the perforations in the said perforated supporting elements are much bigger than in the perforated plates; however, two equal types of wire meshes may be used. With the aid of these perforated plates it is possible to introduce the movable objects at any place in the column. The movable objects are preferably spherical. The spheres or balls are preferably put in motion by vibrating the entire column at a frequency of 100-10,000 pulsations per minute and an amplitude of 0.1 to 5 mm. The balls can of course also be put in motion in other ways, for instance electromagnetically if made of iron or steel.

With columns of larger diameters it is also of advantage to connect all perforated plates by one or more rods and to set the combined set of interconnected perforated plates in vibrational motions, thereby provoking the required drumming action to the freely movable objects or balls.

It can be calculated, that in order to set the movable objects into an effective drumming action, they should be subjected to accelerating forces of about between 2 and 5 times the gravitational force.

The freely movable objects should not be packed too closely. However, my experiments have learned in case of moving balls that as an empirical measure the square of the diameter of the balls placed on a certain perforated plate, multiplied by their number, should not exceed the total surface of the said perforated plate preferably from between 50% and 95% of the surface of the said plate.

Thus, on a perforated plate having a surface of 50 $cm^2$ not more than about 50 balls of a diameter of 10 mm and not more than about 12 balls having a diameter of 20 mm should be placed. A minimum of 1 ball per surface of about 10 $cm^2$ appears to be a minimum to exert an appreciable effect. Advantageously the sum of the square of the diameter of the balls used is between about 60 and about 100% of the surface of the perforated plates in question and preferably between about 75 and about 95%.

It is pointed out that promoting the screening effect of vibrating sieves by means of a drumming action of movable objects is known in the art. In sifting powdered material in a gaseous system however, the problems are much simpler. A crystallisation column is concerned with a fairly dense crystal suspension which has to sink (or rise as the case may be) through the slowly rising (or descending) liquid owing to the effect of gravity.

The object of the supporting elements is to provide vibrating objects also below each of the perforated plates so that the said plates will be beat or subject to a drumming action from both sides when vibrated. When the crystals are less denser than the liquid and the screens are more than a few centimeters apart the said supporting screens will be particularly useful.

It has appeared to applicant that a very good effect is obtained from the column according to the invention owing to the intensive milling and agitating action of the objects, localised over and/or under the perforated plates. Any undesirable adhesion of the crystals to the wall is prevented.

Any crystal conglomerates formed are quickly shattered. Surprisingly, it appeared that the packing of the crystals could be as tightly as the packing of a chromatography column. This further promotes the localised nature of the agitating effect of the moving objects, so that the separating effect of the column per unit of length is unusually high.

BRIEF DESCRIPTION OF THE DRAWING

The invention is illustrated with reference to some preferred embodiments of a crystallisation column as shown in the drawing, wherein FIG. 1 schematically shows a column which is mounted in a frame so as to be vibrated as a whole, and FIG. 2 schematically shows a number of perforated plates mounted on a central shaft in such a way that the combination of plates and shaft can be vibrated.

DESCRIPTION OF THE PREFERRED EMBODIMENTS

Figure 1:
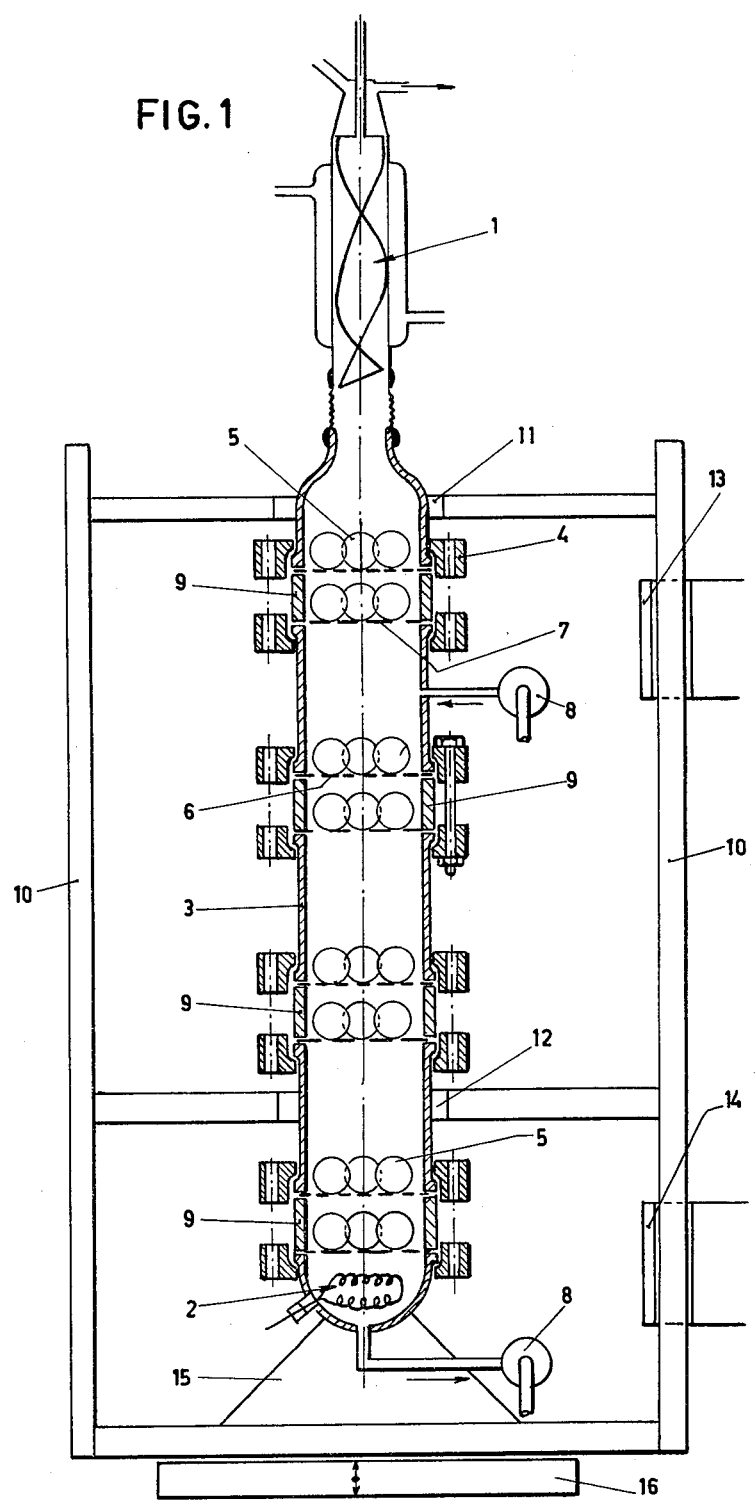

At one end of the column of FIG. 1 is the crystalliser (1) provided with a cooling mantle and with some kind of helical crystal scraper and at the other end is the melt section (2) which is provided with a heating coil for administering the required melting energy. The column itself consists of four glass tube segments (3) 100 mm long and 80 mm in diameter, connected together with flanged joints (4). Between two connected tube segments there is a perforated plate (6) of an inert plastic material such as designated by the Trade Mark "Teflon", with 2 mm openings, a plastic ring (9) and a supporting plate (7) of a similar material. Ten stainless steel balls (5) 15 mm in diameter lie on the perforation and five stainless steel balls 15 mm in diameter on the supporting plate. The column is jacketed with a layer of insulating material and a heating or chilling device in order to make adiabatic functioning of the column possible. Two proportioning pumps are indicated as 8. The column is fitted in a U-shaped frame 10 slidably mounted in sleeves 13 and 14 which are fixed to a wall or the like. The column is fixed to the frame 10 by means of clamps 11 and 12 and support 15. The frame is mounted on a mechanical vibrator device 16.

The embodiment illustrated in FIG. 2 is developped for larger units. FIG. 2 only shows details of the construction of the mantel 17 as part of a crystallisation column. There is mounted a central shaft 18 on which is arranged a number of perforated plates 19. Each of the plates 19 rests on a saucer 20, which—with some clearance—is movably arranged within the mantel 17 and is supported by ribs 21, which are fixed to ferrules 22 which are glidingly fitted on the shaft 18 so as to centre the perforated plates 19.

A number of ferrules 22 and the plates 19 supported by them are resilently supported by a few spring members 23, arranged at one end in a flange 24 of mantel 17, and on their other end in a recess 25 of the lowermost ferrule 22 of the set.

At the top side of shaft 18, outside of the column, a vibrating device 26 is mounted so as to impart a substantial vertical vibration to the agregation of shaft and plates.

COMPARITIVE EXAMPLES

The type of column according to the invention proved to be applicable to greatly differing systems, such as:

benzene-cyclohexane (from the melt);

water-salt (from the melt); the specific gravity of the crystals is less than that of the melt, and the crystals therefore rise in the column.

napthalene-benzoic acid (from the melt);

napthalene-benzoic acid (with ethyl alcohol as solvent);

napthalene-$\beta$ naphthol (with ethyl alcohol as solvent).

The first-mentioned substance is in all cases the substance to be purified and the second the "impurity".

The velocities of crystal flow applied therein were about 50 g/hour per cm$^2$ column cross-section. A column length of 30 cm and a diameter of 25 mm built up of three sections with four perforated plates and four supporting plates proved quite ample for removing a few percent of an impurity that did not form any mixed crystals with the main component.

EXAMPLE I

Upon treating a mixture of 95% benzene and 5% cyclohexane in the 30 cm long column mentioned above it was found that cyclohexane could not be detected refractometrically any longer in the product removed from the bottom. At the top of the column benzene with 10% cyclohexane was removed with a reflux ratio of 4.

A higher percentage of cyclohexane in the top product is more likely to be obtained with a longer column than with a higher reflux ratio.

EXAMPLE II

Benzene contaminated with 20,000 ppm (parts per million) (i.e. 2%) of cyclohexane is subjected to purification in a crystallisation column according to the invention which, apart from the crystallisation and melt sections had a length of 50 cm and a diameter of 80 mm. The column was provided with six stainless steel wire meshes having openings of 2 by 2 mms, two of them being positioned above and four of them below the location of the supply to the column.

Ten stainless steel balls of 20 mm diameter were placed on each wire mesh.

At a crystal flow of about 1 kg per hour (as calculated from the heating energy fed to the melt section) and a supply of the contaminated product of 700 g per hour, a yield of 600 g per hour of purified product was obtained.

The temperature in the melt section was about 5.5° C. (the melting point of benzene).

The purified benzene obtained showed a cyclo-hexane content of 30 ppm.

Similar results were obtained on varying the circumstances in the crystallisation section such as the temperature of the supply of cooling liquid, the rotation speed of the crystal scraper present in the melt section, the shape of the scraper etc.

Therefore it is clear that the circumstances need not be very carefully chosen.

EXAMPLE III

Benzene, contaminated with 6400 ppm thiophene (mixed crystal contamination; proportionality coefficient 0.43) was introduced into a crystallisation column according to the invention being provided with wire mesh screens having openings of 0.6 by 0.6 mm. At each of the screens thirty balls were placed of 12 mm diameter.

The product drawn from the bottom side of the column only contained 600 ppm thiophene whereas the top product contained 20,000 ppm.

This corresponds to a separation effect of four theoretical plates.

EXAMPLE IV

A column as described in Example II was fed with cyclohexane contaminated with 3000 ppm of benzene (proportional coefficient 0.33).

The bottom product of the column showed a benzene content of only 10 ppm and the top product contained 10000 ppm benzene.

This result corresponds to six theoretical plates.

BATCHWISE APPLICATION

It was furthermore found that batchwise application of the column according to the invention offers similar advantages. The column is loosely filled with a suspension of the crystal mass to be purified. Next, either a solvent or an almost saturated solution of the substance to be purified is fed through the column from the bottom.

At the top of the pulsating exchange section either the solvent is evaporated or mother liquid with impurity is removed.

EXAMPLE V

A suspension in acetone of 200 grams of stearic acid having an iodine value of 5 is introduced into a column according to the invention 30 cm long and 25 mm in diameter and is vibrated for several minutes. After this, 200 g acetone is fed into the bottom of the vibrating column and at the top the quantity of liquid arriving there is removed. This contains only a few percent of the initial content of stearic acid. The wet crystal mass is thereafter drawn off from the column and the mother liquor remaining behind is evaporated. The iodine value of the stearic acid has now become less than 0.1. Owing to the vibrating and milling action of the balls the crystals remain small.

EXAMPLE VI

A suspension in acetone containing 600 g of a crystal mixture composed of circa 45% palmitic acid, circa 45% stearic acid, the remainder being oleic acid, is put in a column according to the invention. This column of 80 cm length was provided with screens positioned at mutual distances of 50 mm having openings of 2 by 2 mms. Five plastic balls (made of "Teflon") were present on each screen.

The starting mixture to be separated had a melting point of 54.6° C. and an iodine number of 7.

After the column had been filled with the suspension, acetone of ambient temperature was supplied to the bottom of the column with a velocity of flow of 600 mls per hour. The acetonic solution arising at the top side was discharged, evaporated and recycled at the top side at about a tenfold concentration.

After a few hours the crystal mass at the bottom of the column consisted of substantially pure stearic acid having a melting point of 69.1° C. and iodine number of 0.1. Thereafter an hourly production yield of 70 g of said purified product was obtained.

On purifying the same starting product by means of recrystallisation, a similar purification result could only be obtained after five consecutive recrystallisations.

I claim:

1. In the process for continuous counter current liquid-solids contact comprising the steps of passing a liquid in one direction through a vertically-alligned confined space in contact with a crystalline solid being passed in the other direction, said liquid being a solvent for at least part of said crystalline solid, said confined space being substantially horizontally restricted in a plurality of places, said horizontal restrictions being a plurality of perforated plates positioned at spaced intervals in said vertically aligned confined space-forming compartments, said restrictions being such that the said crystalline solids to be treated in counter current with said liquid substantially pass through said perforated plates, the improvement consisting of providing a pulsating or drumming action against said perforated plates by means of movable objects being substantially vertically vibrated against said perforated plates at a frequency of between 100 and 10,000 vibrations per minute with amplitudes of between 0.1 and 5 millimeters, whereby the passage of said crystalline solids through the perforations of said perforated plates is substantially promoted, said substantially vertical vibrations of said movable objects being effected by motion of said perforated plates in a vertical oscillation at such a rate that said movable objects are subjected to accelerating forces of about 2 to 5 times the gravitational force.

2. The process of claim 1 wherein said movable objects are spherical objects.

3. The process of claim 2 wherein said spherical objects are balls of even diameter and are present to such extent that the square of the diameter multiplied by the number of the balls on a certain perforated plate does not exceed the surface area of the perforated plate on which they are present.

4. The process of claim 3 wherein the square of the diameter of the balls multiplied by the number of the balls present on a certain perforated plate is between 50% and 95% of the surface area of the said plate.

5. The process of claim 1 wherein said motion of said perforated plates in a vertical oscillation is caused by vertically oscillating said confined space.

6. The process of claim 1 wherein said motion of said perforated plates in a vertical oscillation is caused by vertically oscillating all of said perforated plates while maintaining said confined space.

7. The process of claim 3 wherein the square of the diameter of the balls multiplied by the number of balls present on a certain perforated plate is between 75% and 95% of the surface area of said plate.

* * * * *